United States Patent
O'Sullivan et al.

(10) Patent No.: US 9,471,319 B2
(45) Date of Patent: *Oct. 18, 2016

(54) SYSTEM MANAGEMENT AND INSTRUCTION COUNTING

(71) Applicant: International Business Machines Corporation, Armonk, NY (US)

(72) Inventors: Patrick J. O'Sullivan, Dublin (IE); John J. Thomas, Fishkill, NY (US); Barry E. Willner, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 129 days.

This patent is subject to a terminal disclaimer.

(21) Appl. No.: 14/224,269

(22) Filed: Mar. 25, 2014

(65) Prior Publication Data

US 2014/0282607 A1    Sep. 18, 2014

Related U.S. Application Data

(63) Continuation of application No. 13/844,189, filed on Mar. 15, 2013.

(51) Int. Cl.
*G06F 9/30*     (2006.01)
*G06F 9/40*     (2006.01)
(Continued)

(52) U.S. Cl.
CPC .............. *G06F 9/38* (2013.01); *G06F 9/3851* (2013.01); *G06F 9/461* (2013.01); *G06F 9/4881* (2013.01); *G06F 11/30* (2013.01); *G06F 2209/486* (2013.01)

(58) Field of Classification Search
CPC ........ G06F 9/3851; G06F 9/38; G06F 9/461; G06F 11/30; G06F 9/4881; G06F 2209/486
USPC ......................................................... 712/214
See application file for complete search history.

(56) References Cited

U.S. PATENT DOCUMENTS

5,490,272 A     2/1996   Mathis et al.
5,812,811 A *   9/1998   Dubey .................. G06F 9/3009
                                                         712/200

(Continued)

OTHER PUBLICATIONS

U.S. Appl. No. 13/844,189, entitlted "System Management and Instruction Counting", filed Mar. 15, 2013.

*Primary Examiner* — Chun-Kuan Lee
(74) *Attorney, Agent, or Firm* — Patterson + Sheridan, LLP

(57) ABSTRACT

Techniques for managing a plurality of threads on a multi-threading processing core. Embodiments provide an instruction count threshold condition that determines how many countable instructions of a thread the multi-threading processing core will execute before context switching to another one of the plurality of threads. A first plurality of instructions for a first one of the plurality of threads is processed on the multi-threading processing core. Embodiments determine, for each of the first plurality of instructions, whether the instruction is a countable instruction, wherein at least one of the first plurality of instructions is not a countable instruction. A count of the countable instructions is maintained. Upon determining that the instruction count threshold condition is satisfied, based on the maintained count, embodiments context switch the multi-threading processing core to process a second plurality of instructions for a second one of the plurality of threads.

8 Claims, 7 Drawing Sheets

(51) Int. Cl.
*G06F 9/38* (2006.01)
*G06F 9/46* (2006.01)
*G06F 9/48* (2006.01)
*G06F 11/30* (2006.01)

(56) References Cited

U.S. PATENT DOCUMENTS

| | | |
|---|---|---|
| 5,835,705 A | 11/1998 | Larsen et al. |
| 6,018,759 A | 1/2000 | Doing et al. |
| 6,076,157 A | 6/2000 | Borkenhagen et al. |
| 6,625,635 B1 | 9/2003 | Elnozahy |
| 6,981,261 B2 | 12/2005 | Kalafatis et al. |
| 7,337,303 B2 | 2/2008 | Anderson et al. |
| 7,925,869 B2 | 4/2011 | Kelsey et al. |
| 8,032,737 B2 | 10/2011 | Kang et al. |
| 8,117,618 B2 * | 2/2012 | Holloway ............ G06F 9/4881 718/102 |
| 2008/0201716 A1 * | 8/2008 | Du ...................... G06F 9/30145 718/104 |
| 2009/0235262 A1 | 9/2009 | Ceze et al. |
| 2014/0189322 A1 * | 7/2014 | Ould-Ahmed-Vall  G06F 11/3466 712/223 |

\* cited by examiner

SYSTEM MANAGEMENT AND INSTRUCTION COUNTING

CROSS-REFERENCE TO RELATED APPLICATION

This application is a continuation of co-pending U.S. patent application Ser. No. 13/844,189, filed Mar. 15, 2013. The aforementioned related patent application is herein incorporated by reference in its entirety.

BACKGROUND

The present disclosure generally relates to computer systems, and more specifically, to techniques for thread scheduling on a processing core based on a number of instructions a thread has executed.

The basic structure of a conventional computer system includes a system bus or a direct channel that connects one or more processors to input/output (I/O) devices (such as a display monitor, keyboard and mouse), a permanent memory device for storing the operating system and user programs, (such as a magnetic hard disk), and a temporary memory device that is utilized by the processors to carry out program instructions (such as random access memory or "RAM"). When a user program runs on a computer, the computer's operating system (OS) may first load the program files into system memory. The program files could include data objects and instructions for handling the data and other parameters which may be input during program execution.

Generally, the operating system creates a process to run a user program. A process is a set of resources, including (but not limited to) values in RAM, process limits, permissions, registers, and at least one execution stream. Such an execution stream is commonly termed a "thread." The utilization of threads in operating systems and user applications is well known. Threads allow multiple execution paths within a single address space (the process context) to run concurrently on a processor. This "multithreading" increases throughput and modularity in multiprocessor and uniprocessor systems alike. For example if a thread must wait for the occurrence of an external event, then it stops and the computer processor executes another thread of the same or different computer program to optimize processor utilization. Multithreaded programs also can exploit the existence of multiple processors by running the application program in parallel. Parallel execution reduces response time and improves throughput in multiprocessor systems.

Additionally, a scheduler can be configured to manage the execution of multiple threads on a multithreaded processor. Generally speaking, the act of suspending a first thread that is executing on the processor and beginning the execution of a second thread on the processor is known as context switching. Here, a context represents the contents of the processor's registers and program counter at some point in time. A register is a small amount of memory (typically very fast memory) inside of a processing unit (as opposed to the slower Random Access Memory (RAM) outside of the processing unit) that is used to speed the execution of computer programs by providing quick access to commonly used values. For instance, such a register could store values that are used in the midst of a calculation on the processing unit. A program counter is a specialized register that indicates the position of the processing unit in its instruction sequence. Such a program counter may hold the address of the instruction being executed or could hold the address of the next instruction to be executed, depending on the specific system.

More specifically, context switching may be described as the kernel (i.e., the core of an operating system) performing the following activities with regard to processes (including threads) on the processing unit: (1) suspending the progression of one process and storing the processing unit's state (i.e., the context) for that process somewhere in memory, (2) retrieving the context of the next process from memory and restoring it in the processing unit's registers and (3) returning to the location indicated by the program counter (i.e., returning to the line of code at which the process was interrupted) in order to resume the process. A context switch may be described as the kernel suspending execution of one process on the processing unit and resuming execution of some other, previously suspended process. Put another way, context switching refers to suspending progression of a process in order to advance the progression (with regard to execution) of a second process.

SUMMARY

Embodiments provide a method, system and computer program product for managing a plurality of threads on a multi-threading processing core. The method, system and computer program product include providing an instruction count threshold condition that determines how many countable instructions of a thread the multi-threading processing core will execute before context switching to another one of the plurality of threads. Additionally, the method, system and computer program product include processing a first plurality of instructions for a first one of the plurality of threads on the multi-threading processing core. The method, system and computer program product further include determining, for each of the first plurality of instructions, whether the instruction is a countable instruction, wherein at least one of the first plurality of instructions is not a countable instruction. The method, system and computer program product also include maintaining a count of the countable instructions. Furthermore, the method, system and computer program product include, upon determining that the instruction count threshold condition is satisfied, based on the maintained count, switching the multi-threading processing core to process a second plurality of instructions for a second one of the plurality of threads.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
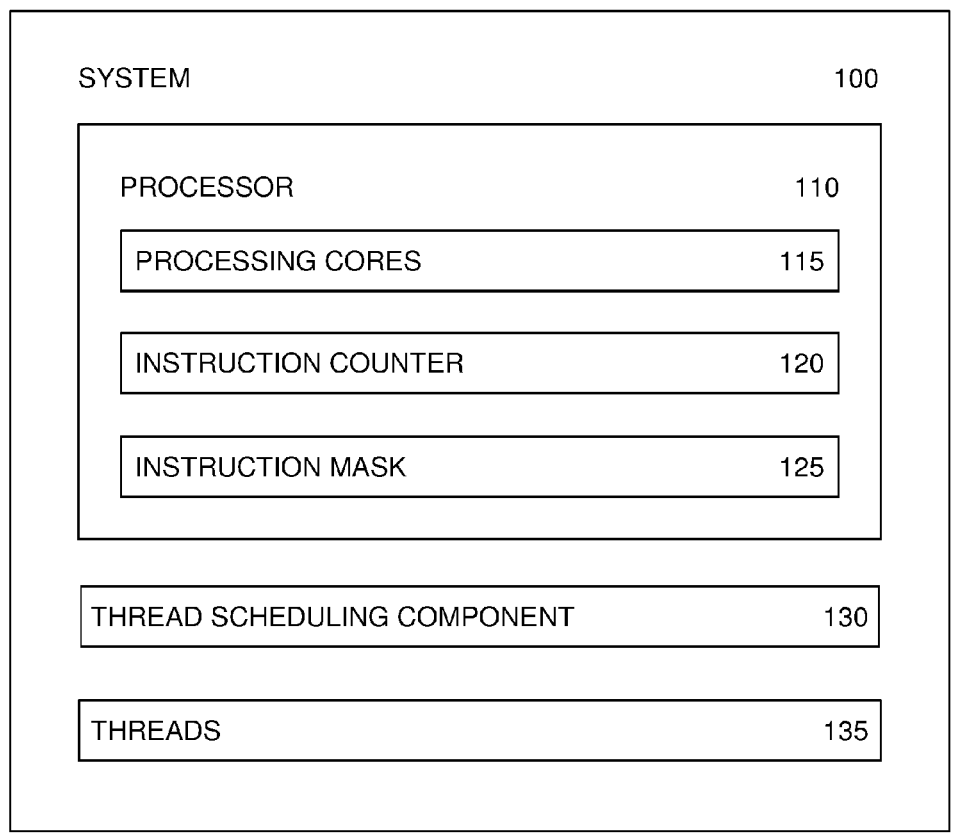
FIG. 1 is a block diagram illustrating a system configured with a thread scheduling component, according to one embodiment described herein.

Generally, embodiments described herein provide techniques for thread scheduling (e.g., context switching) on a processing core based on a number of instructions a thread has executed. While existing techniques provide for context switching based on an amount of time a thread has executed, these existing techniques do not always provide a fair allotment of processing resources to the individual threads executing on the processing core. For example, consider a processing core that supports Hyper-Threading technology. In such an example, the processing core could be capable of executing a single thread in isolation and could also be capable of executing multiple threads in parallel simultaneously. However, in such an example, while the overall efficiency of the processor may be increased when executing multiple threads in parallel, the processing efficiency of a single thread could be maximized when the single thread is executing on the processing core in isolation. This may result in inequities between jobs executing on the processing core. For instance, in a computing system where users are charged based on an amount of time their jobs are executed on the processing core, a first user may receive a more favorable pricing arrangement when his job is executed as the sole thread on a processing core, while a second user may receive a less favorable pricing arrangement when his job is executed simultaneously in parallel with a second thread on the processing core.

As such, embodiments provide techniques for managing a plurality of threads on a multi-threading processing core. Embodiments may provide an instruction count threshold. Generally, the instruction count threshold indicates how many countable instructions of a thread the multi-threading processing core will execute before context switching to another one of the plurality of threads. That is, for a processing core capable of executing a plurality of different instructions, embodiments may classify a first portion of the plurality of instructions as countable instructions and a remaining portion as uncounted instructions. Embodiments may then begin process instructions for a first thread on the multi-threading processing core. Additionally, embodiments may determine a number of countable instructions that the multi-threaded processing core has processed for the first thread. That is, embodiments may maintain a count of how many countable instructions the processing core has processed for the first thread, where the uncounted instructions processed for the first thread are not included in the maintained count. For instance, an instruction identifier value could be set for the currently executing instruction, where a particular bit of the instruction identifier value is set to identify the currently executing instruction. A mask value that includes a set bit for the identifier of each countable could then be applied to the instruction identifier value to determine whether the currently executing instruction is a countable instruction (e.g., by performing an AND operation between the instruction identifier value and the mask value). Upon determining that the maintained count of instructions exceeds an instruction count threshold, embodiments may switch the multi-threading processing core to process instructions for a second thread. Advantageously, by context switching between threads on the processing core based on a number of countable instructions executed for the currently executing thread, embodiments may more fairly allocate processing resources to threads executing on the processing core.

In one embodiment, each of the plurality of instructions may be classified as either countable instructions or uncounted instructions based on how often the respective instruction conflict with other instructions. For example, the execution of a first instruction could include operations on the processing core that are infrequently used by other instructions (e.g., one or more adders within the processing core), while the execution of a second instruction could include operations on the processing core that are frequently used by other instructions (e.g., one or more multipliers within the processing core). In such an example, embodiments could consider the first instruction to be an uncounted instruction as the operations involved in executing the first instruction would rarely conflict with the execution of other instructions, and thus the first instruction could frequently be executed simultaneously in parallel with other instructions on the processing core. Likewise, embodiments could consider the second instruction as a countable instruction, as the second instruction would frequently conflict with the execution of other instructions, and thus the second instruction may need to be executed in isolation on the processing core (i.e., not simultaneously and in parallel with other instructions).

In a particular embodiment, embodiments may be configured to recognize more than two tiers of instructions within the plurality of instructions. That is, in lieu of or in addition to maintaining a designation of countable and uncounted instructions, embodiments may classify the plurality of instructions into additional tiers of instructions. For example, embodiments could designate five different tiers of instructions based on how often the individual instructions conflict with other instructions. In such an example, a first of the five tiers could represent uncounted instructions, while the remaining four tiers represent various pricing models for countable instructions. For instance, embodiments could classify a particularly resource intensive instruction (e.g., an instruction involving a START I/O operation) into the most expensive tier, and could classify a less resource intensive instruction (e.g., an instruction involving a floating point calculation) into a less expensive (but still countable) tier. Additionally, embodiments could maintain a separate mask value corresponding to each of the tiers, where the mask values include a set bit that corresponds to an identifier for each instruction within the respective tier. Embodiments could then apply these masks to an instruction identifier value for the currently executing instruction to determine which tier the instruction belongs to. Advantageously, by doing so, embodiments may more equitably charge users for their use of the processing resources.

In some circumstances, embodiments may suspend the execution of a thread before the instruction counter reaches the threshold level. For example, a thread may need to wait on a disk drive to be read once a particular I/O operation is executed. In such a situation, embodiments could suspend the execution of the thread until the disk I/O operation is complete. In doing so, embodiments could store the current instruction counter and mask(s) for the thread as part of the context for the thread. When the thread is re-dispatched at some later point in time, the instruction counter value and mask(s) could be reloaded into the corresponding registers and the execution of the thread could continue. Doing so allows embodiments to efficiently execute threads on the processing core, while ensuring that each thread receives its share of countable instruction executions.

FIG. 1 is a block diagram illustrating a system configured with a thread scheduling component, according to one embodiment described herein. As shown, the system 100 includes a processor 110. Such a processor 110 could be connected to various I/O devices and memory device(s) by a system bus. The system also includes a thread scheduling component 130 and a plurality of threads 135. For instance, the thread scheduling component 130 could reside in a memory of the system 100 (e.g., as part of a hypervisor or an operating system kernel). Additionally, as shown, the processor 110 contains one or more processing cores 115, one or more instruction counters 120, and one or more instruction masks 125. Generally, the instruction counter 120 represents a value (e.g., stored in a register of the processor 110) indicative of a number of countable instruction a currently executing thread has executed the respective processing core 115. Additionally, as discussed above, the instruction mask 125 could be used to determine whether a particular instruction is a countable instruction (e.g., by applying the instruction mask value 125 to an instruction identifier value corresponding to the currently executing instruction).

For instance, the processor 110 could contain a respective instruction counter 120 for each of one or more instruction masks 125 for each of the processing cores 115. Generally speaking, a processor 110 may include multiple instruction masks 125 when counting multiple tiers of instructions. As an example, a processor 110 could be configured with 4 processing cores 115, 20 instruction masks 125 (i.e., 5 instruction masks 125 corresponding to each processing core 115 and for handling 5 different tiers of instructions), and 20 instruction counters 120 (i.e., one corresponding to each instruction mask 125). In one embodiment, a single set of one or more instruction masks 125 are used by multiple processing cores 115. In such an embodiment, a respective instruction counter 120 may be provided for each instruction mask 125 for each of the processing cores 115. For instance, a processor 110 could contain four processing cores 115, where a first set of 2 processing cores 115 are configured to share a first set of 5 instruction masks 125, and a second set of 2 processing cores 115 are configured to share a second set of 5 instruction masks 125. In such an embodiment, 20 instruction counters 120 may be provided, where a respective set of 5 instruction counters 120 are provided to each of the four processing core 115. More generally, it is broadly contemplated that processors may include any combination of processing cores 115, instruction counters 120 and instruction masks 125, consistent with the functionality described herein.

In one embodiment, the processing cores 115 are configured with Hyper-Threading technology. For example, each of the processing cores 115 could be capable of processing four separate threads simultaneously. In such an embodiment, each processing core 115 could be configured with four instruction counters 120, where each of the four instruction counters 120 corresponds to one of the threads executing in parallel on the processing core 115. Additionally, the processor 110 could include four instruction masks 125, one for each of the instruction counters 120. Continuing the above example of a processing core 115 capable of processing four separate threads simultaneously, the processing core 115 could be configured with eight instruction counters 120 and eight instruction masks 125, where a respective set of two instruction masks 125 is assigned to each concurrently executing thread on the processing core 115, and where each instruction counter 120 corresponds to a respective instruction mask 125 for use in handling different tiers of instructions.

As discussed above, one or more instruction masks 125 may be shared by multiple threads executing on the processing core 115. For instance, the thread scheduling component 130 could manage the four threads using a shared set of five instruction masks 125 (i.e., for handling 5 different tiers of instructions). In such an embodiment, the processing core 115 could be configured with twenty instruction counters 120, where a respective set of five instruction counters 120 is provided for each of the simultaneously executing threads. Thus, in the case of a processor 110 that includes four of these processing cores 115, each capable of processing four separate threads simultaneously, the processor 110 could be configured with twenty instruction masks 125 (e.g., a respective set of five instruction masks 125 for each of the processing cores 115) and eighty instruction counters 120 (e.g., 20 instruction counters 120 for each of the four processing cores 115). Of course, the above examples are provided for illustrative purposes only and are without limitation. Moreover, one of ordinary skill in the art will recognize that any number of processing cores 110, instruction masks 125 and instruction counters 120 may be used, consistent with the functionality described herein.

In one embodiment, two or more threads running simultaneously on the processing core 115 are configured to share a set of one or more instruction counters 120. In such an embodiment, the instruction counter(s) 120 could store a combined total of countable instructions for the two or more threads. That is, the shared instruction counter 120 could store the sum of the number of countable instructions executed by each of the two or more threads. Such an embodiment may be preferable, for instance, in situations where a relationship exists between the two or more threads (e.g., the threads are owned by the same user or entity).

Each of the threads 135 could include a set of register values and an execution stack. The register values could be loaded into the CPU registers when the thread executes, and the register values could be saved back into memory when the thread is suspended. Generally, the code that a particular thread 135 runs is determined by the contents of a program counter within the register set. The program counter generally points to an instruction within the code segment of an application program or to system code. As an example, the program counter could point to an instruction within an application program that invokes a system service relating to file I/O (e.g., reading a file). The system code could then begin executing to perform the I/O operation, throughout which the program counter could point to instructions within the system code. Additionally, a memory of the system 100 may contain logical addresses for data and instructions utilized by the process, including the stacks of the various threads. After a thread is created and prior to termination of the thread, the thread may utilize system resources to gain access to process context information. Through the process context information, process threads can share data and communicate with one another in a simple and straightforward manner.

As discussed above, multiple techniques exist for thread scheduling when implementing threads on a processing core. In a first category, there are cooperative threads which do not rely on a scheduler and cooperate among themselves to share the CPU. Because of the complexities involved in programming such threads, and because they oftentimes cannot react quickly to external events, cooperative threads are not frequently utilized. In a second category are pre-emptive threads. Such threads rely on a scheduler that can decide to switch a processing core 115 from one thread to another at any point during the execution. Pre-emptive threads react quickly to external events because the currently running thread could be pre-empted out of the processing core 115 and another thread takes over to handle an urgent operation, if needed. Unlike cooperative threads, pre-emptive scheduling relieves the programmer from the burden of implementing the scheduling mechanism within the application program.

Pre-emption of a running thread can generally occur at any point during program execution. For instance, pre-emption could occur when a timer expires allowing the scheduler to intervene and switch the CPU among threads. This may be referred to as "time slicing" the CPU amongst a plurality of threads and each thread is said to run for a "time slice." This form of intervention allows the scheduler to implement various scheduling mechanisms, including round robin and priority scheduling, among others. Additionally, pre-emption could also occur in response to external events that may require the immediate attention of some thread.

In the context of the present disclosure, techniques are provided for managing a plurality of threads on a multi-threading processing core. For instance, embodiments may provide an instruction count threshold indicative of how many countable instructions of a thread the multi-threading processing core will execute before context switching to another one of the plurality of threads. As discussed above, for a processor capable of processing a plurality of instructions, embodiments may be configured to recognize a first portion of the plurality of instructions as countable instructions and a second portion of the plurality of instructions as uncounted instructions. Embodiments may then process a first plurality of instructions for a first thread on the multi-threading processing core. While the first plurality of instructions are executing, embodiments may determine a number of countable instructions from the first plurality of instructions that the multi-threaded processing core has processed. For instance, embodiments could be configured to apply a mask value to an instruction identifier value for each executed instruction in order to determine whether the executed instruction is a countable instruction. Upon determining that the number of countable instructions exceeds the instruction count threshold, embodiments may context switch the multi-threading processing core to a second thread. Advantageously, doing so helps to ensure that each thread is given an equitable share of processing core resources on the system 100.

Generally, embodiments may manage the count of countable instructions in various different ways. For instance, an instruction counter 120 could be set to "0" upon context switching to a new thread, and the instruction counter 120 could be incremented each time the new thread executes a countable instruction. When the instruction counter 120 exceeds a threshold amount of countable instructions, embodiments could context switch to another thread. In one embodiment, the instruction counter 120 could be set to the threshold amount of countable instruction upon context switching to a new thread, and the instruction counter 120 could be decremented each time the new thread executes a countable instruction. In such an embodiment, when the instruction counter 120 reaches "0", embodiments could context switch to another thread. In other embodiments, context switching is based on a Boolean combination of instruction counters or some other function of the count values satisfying a defined condition. For instance, a combined threshold value could be provided for a set of five instruction counters 120, where each instruction counter 120 corresponds to a respective tier of instructions, and embodiments could further assign a weight to each of the tiers of instructions. Embodiments could then calculate a total weighted instruction count by applying the respective weights to each of the instruction counters 120 and calculating the sum of all the weighted counts. More generally, it is broadly contemplated that any function or conditional logic may be applied to determine when to context switch based on the instruction counter(s) 120, consistent with the functionality described herein.

Figure 2A:
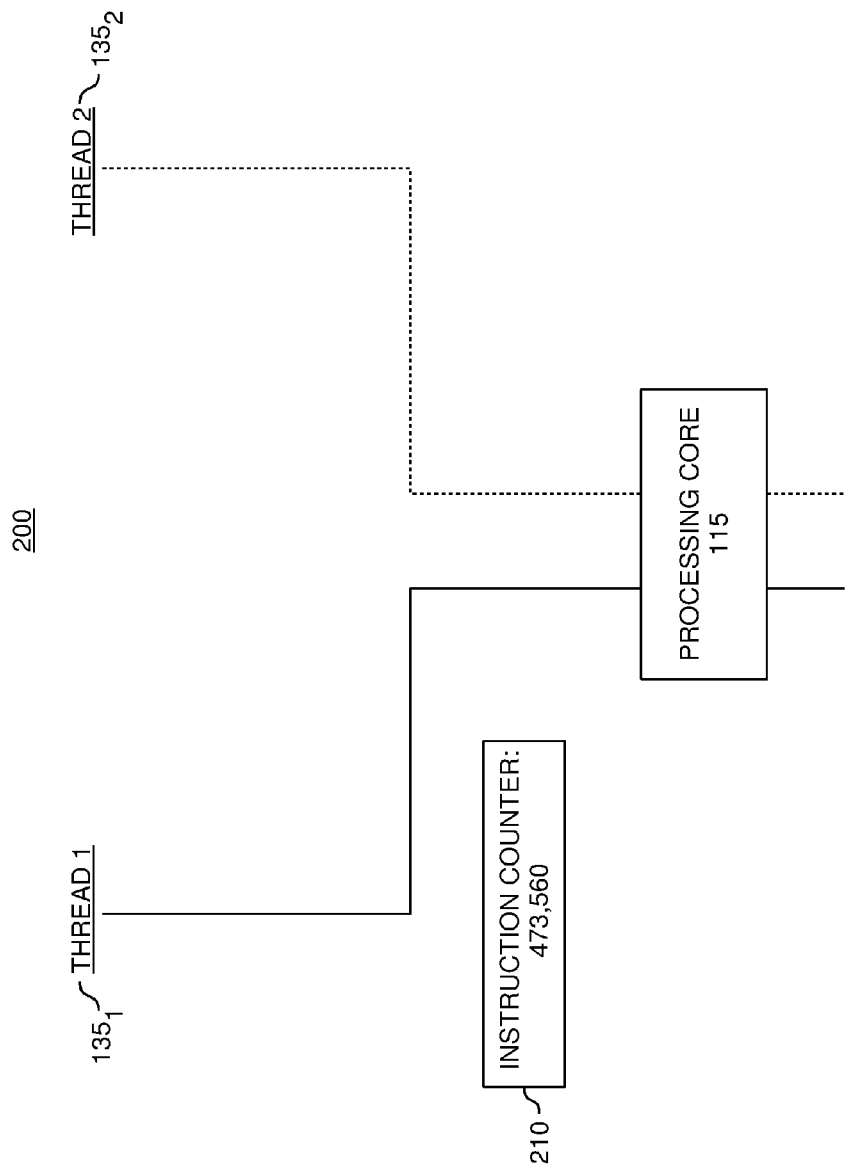
FIGS. 2A-B illustrate an example of thread scheduling on a processing core, according to one embodiment described herein.
Figure 2B:
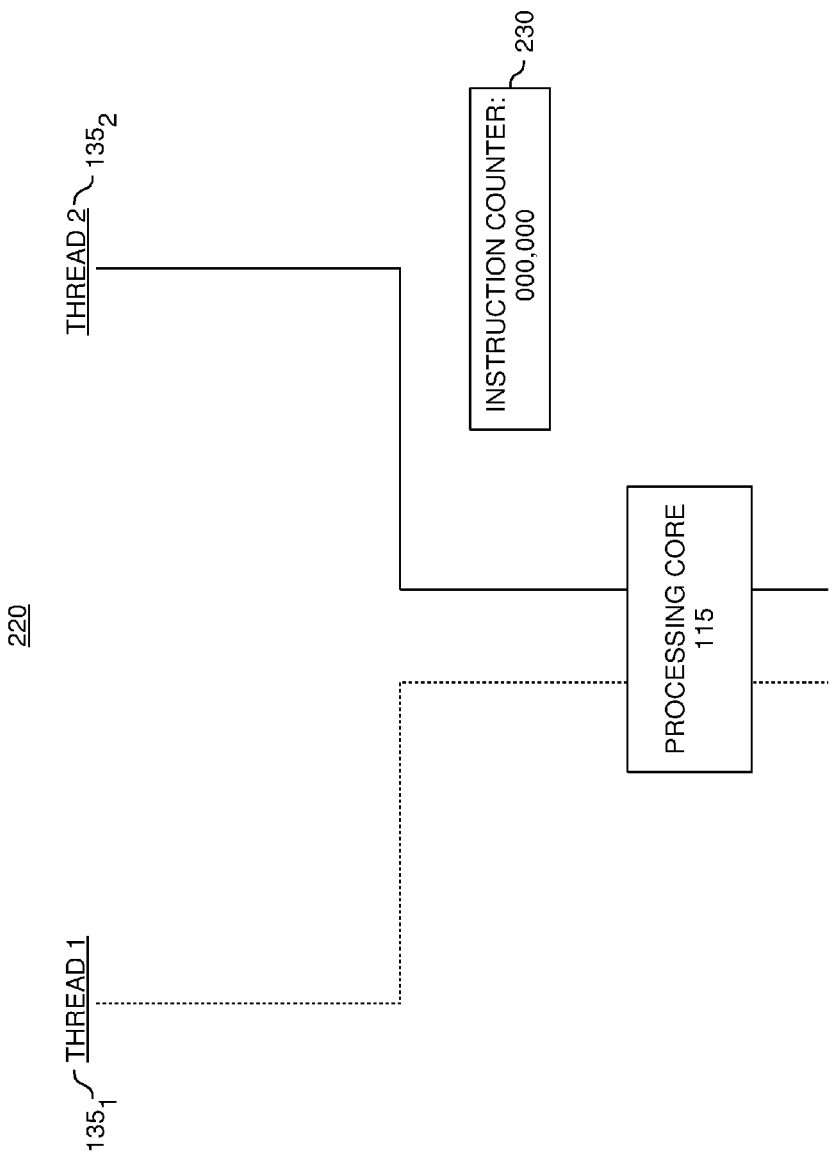

FIGS. 2A-B illustrate an example of thread scheduling on a processing core, according to one embodiment described herein. As shown, the diagram 200 in FIG. 2A includes a plurality of threads $135_{1-2}$, a processing core 115 and an instruction counter 210. Here, the thread $135_1$ is currently executing on the processing core 115, as shown by the solid line, and the thread $135_2$ has been suspended and is not currently being executed on the processing core 115, as shown by the dotted line. Additionally, in the depicted example, the instruction counter 210 indicates that 473,560 countable instructions for the thread $135_1$ have been executed. As discussed above, embodiments could determine whether a particular instruction is a countable instruction (as opposed to an uncounted instruction) by, for instance, applying a mask value to an instruction identifier value for the particular instruction.

For purposes of the present example, assume that the thread scheduling component 130 is configured to context switch between threads on the processing core 115 after 1,000,000 countable instructions have been executed for the currently executing thread. As such, once 1,000,000 countable instructions have been executed for the thread $135_1$, the thread scheduling component 130 could suspend the execution of the thread $135_1$ and could resume execution of the tread $135_2$. In doing so, the thread scheduling component 130 could store the current register values, the program counter and any other values associated with executing the first thread $135_1$. Additionally, the thread scheduling component 130 could reset the instruction counter 210 and could begin maintaining a count of how many countable instructions have been executed for the thread $135_2$.

An example of this is shown in FIG. 2B. Here, the diagram 220 illustrates the threads $135_{1-2}$, where the thread $135_1$ has been suspended, as shown by the dotted line, and the thread $135_2$ is currently executing on the processing core 115, as shown by the solid line. Additionally, the diagram 220 includes an instruction counter 230 having a value of "000,000". Thus, in the depicted, example, the thread scheduling component 130 has switched the context of the processing core 115 from processing the first thread $135_1$ to the context for processing the thread $135_2$, and has reset the instruction counter value to begin counting the number of countable instructions executed by the thread $135_2$.

Of note, although the example depicted in FIGS. 2A-B relates to one form of multi-threading on a processor, it is broadly contemplated that embodiments may be practiced with other types of multi-threaded processors as well. For example, embodiments could be implemented for use on a processor that supports simultaneous multi-threading (also referred to as hyper threading). Generally speaking, while the aforementioned example of multi-threading involves switching between the execution of multiple threads on a single processing core with one (logical) instruction pointer and one (logical) set of registers, a simultaneous multi-threaded processing core may literally execute multiple threads at the same time. For example, a simultaneous multi-threaded processing core could have 4 instruction pointers and 4 sets of registers, which could be used to execute 4 separate threads in parallel. In such an example, the simultaneous multi-threaded processing core could also be configured with 4 pairs of instruction count registers and mask registers, with each pair corresponding to a respective pair of one of the instruction pointers and sets of registers (i.e., one for each thread executing in parallel on the processing core). Here, the thread scheduling component 130 could be configured to context switch between threads executing on the processor based on the instruction count registers and mask registers, with up to 4 threads executing simultaneously on the processing core at any one point in time.

Figure 3A:
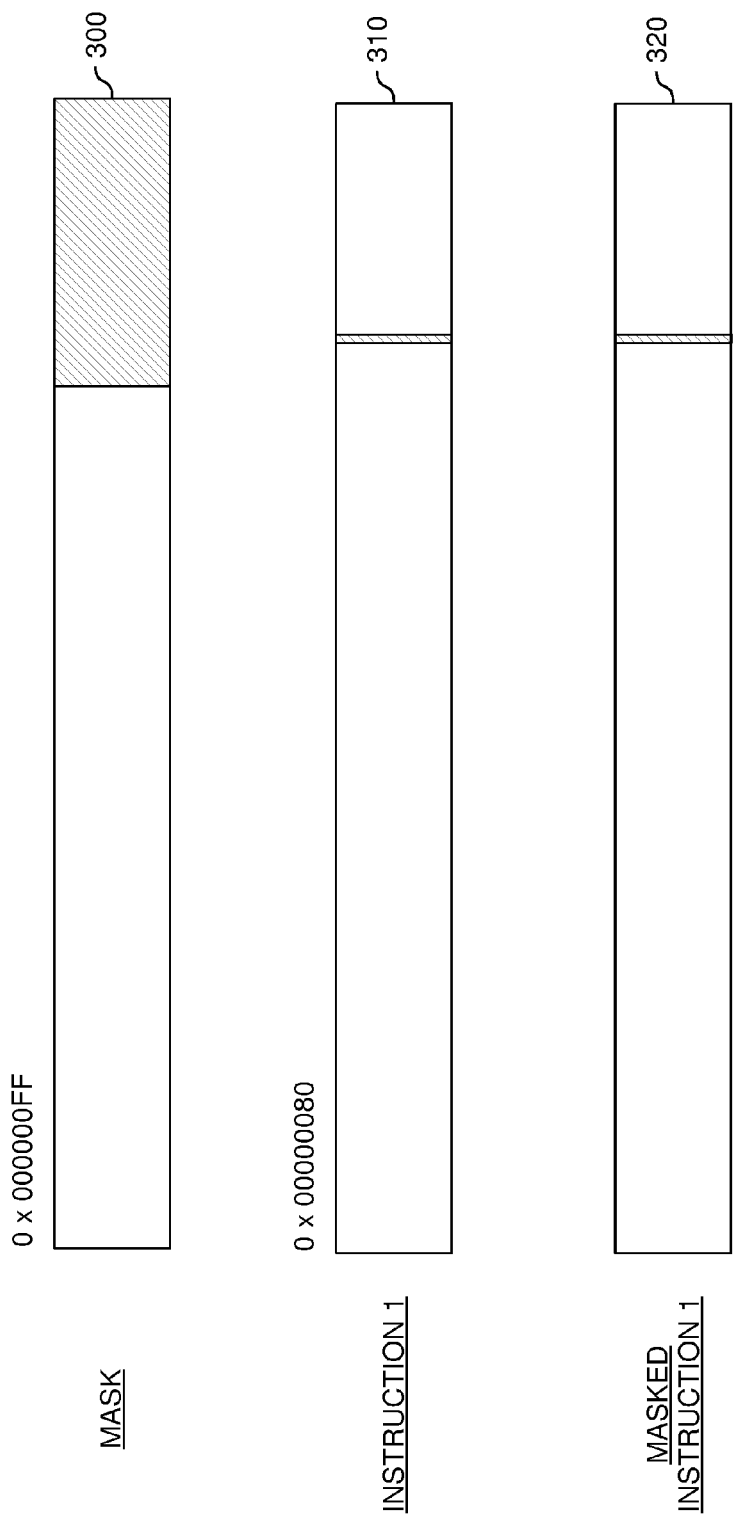
FIGS. 3A-B illustrate an example of a mask for use in counting instructions on a processing core, according to one embodiment described herein.

As discussed above, the thread scheduling component 130 may determine whether a particular instruction is a countable instruction by applying a mask to an instruction identifier value for the particular instruction. An example of this will now be discussed with respect to FIGS. 3A-B, which illustrate an example of a mask for use in counting instructions on a processing core, according to one embodiment described herein. FIG. 3A includes a visual depiction of a mask value 300, a visual depiction of an instruction identifier value 310 and a visual depiction of a masked instruction identifier value 320. In the present example, assume that the mask value is "0x000000FF" and the instruction identifier value is "0x00000080". More specifically, assume that the mask value includes a set bit corresponding to each instruction designated as a countable instruction. Additionally, assume that the visual depiction of the instruction identifier value 310 corresponds to a particular instruction, and further assume that the bit within the instruction identifier value corresponding to the particular instruction has been set.

In the example shown in 3A, the thread scheduling component 130 could apply the mask value 300 to the instruction identifier value 310 by performing an AND operation between these two values. The thread scheduling component 130 could then determine whether the resulting value contains any bits that are set to "1" in order to determine whether the particular instruction is a countable instruction. If instead the resulting value does not contain any set bits, the thread scheduling component 130 could determine that the particular instruction is an uncounted instruction. Thus, in the current example, the thread scheduling component 130 could perform an AND of the mask value (i.e., 0x000000FF) and the instruction identifier value (i.e., 0x00000080), and determine the resulting value (i.e., 0x00000080). The thread scheduling component 130 could then determine that the resulting value of 0x00000080 contains at least one set bit, and as such, could determine that the particular instruction is a countable instruction. The thread scheduling component 130 could then increment an instruction count value upon execution of the particular instruction.

Figure 3B:
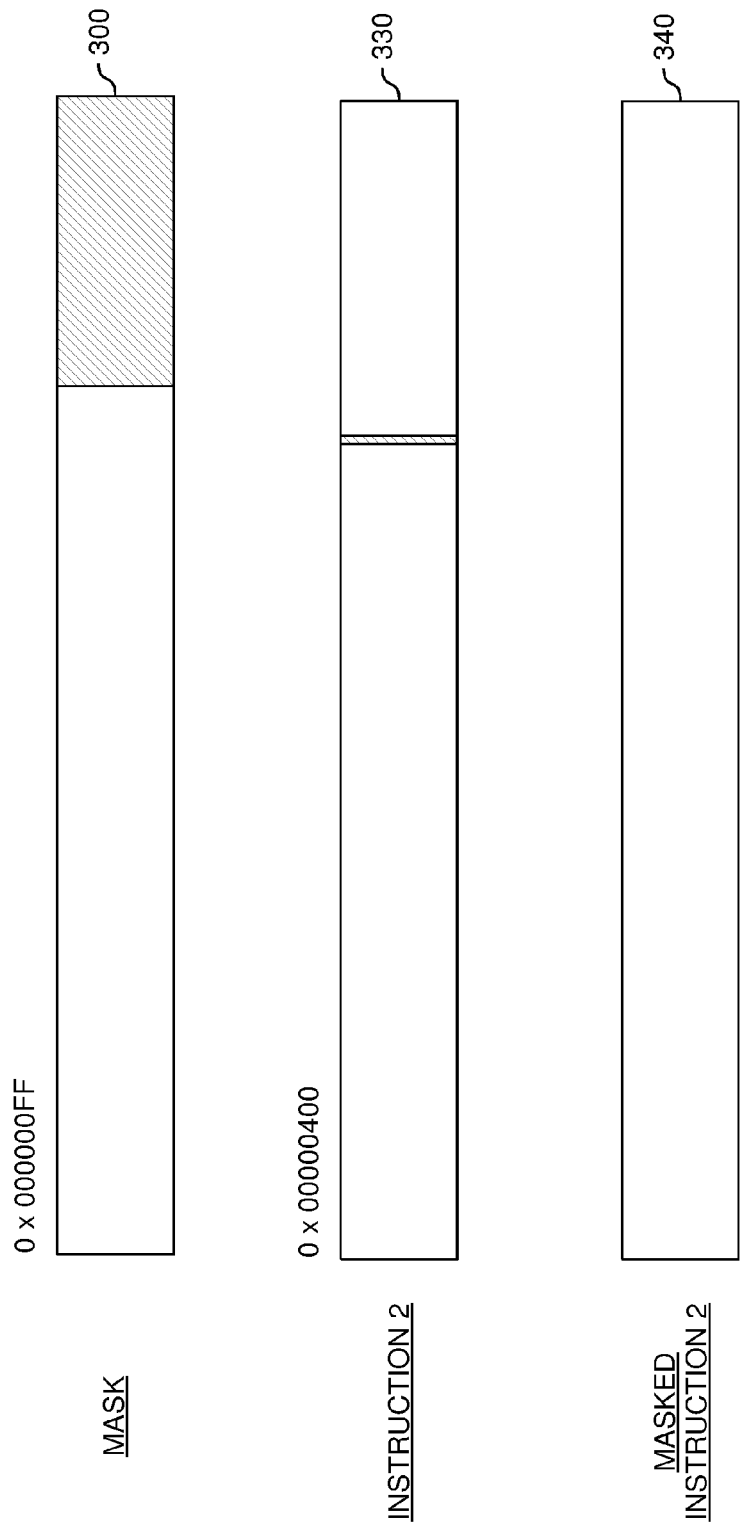

FIG. 3B shows a second example of a mask for use in counting instructions on a processing core. Similar to FIG. 3A, FIG. 3B shows the visual depiction of the mask value 300 (i.e., the mask value 0x000000FF). Additionally, FIG. 3B includes a visual depiction of an instruction identifier value 330 (i.e., the instruction identifier value 0x00000400) that corresponds to a second instruction. In the present example, the thread scheduling component 130 could apply the mask value (i.e., 0x000000FF) to the instruction iden-tifier value (i.e., 0x00000400) by performing an AND operation for these two values to produce a resulting value (i.e., 0x00000000). A visual depiction of this resulting value 340 is also shown in FIG. 3B. The thread scheduling component 130 could then be configured to determine whether the resulting value contains any set bits in order to determine whether the second instruction is a countable instruction. Thus, in the present example, the thread scheduling component 130 could determine that the resulting value of 0x00000000 does not contain any set bits and thus could determine that the second instruction is an uncounted instruction (i.e., as opposed to a countable instruction). Thus, the thread scheduling component 130 could forgo incrementing the instruction counter value when the second instruction is executed.

Additionally, the example depicted in FIGS. 3A-B could relate a variety of different multi-threaded processing cores. For instance, the mask could be applied to the instruction identifier value to determine whether an instruction should be counted on a multi-threaded processor which context-switches between multiple threads, where only one thread is executing at any one point in time. Additionally, the application of the mask as shown in FIGS. 3A-B could also be applied to a simultaneous multi-threaded processor, in which multiple threads are executing on the processing core in parallel. In such an example, the simultaneous multi-threaded processor could be configured with a plurality of masks and instruction counts (i.e., one for each thread that can be executed in parallel on the processor). Moreover, as discussed above, a processor may include multiple instruction masks for use in recognizing multiple tiers of instructions. For example, in addition to recognizing countable and uncountable instructions, the thread schedule component 130 could be configured to recognize uncountable instructions and several different pricing tiers of instructions (e.g., where less resource-intensive instructions are priced lower than more expensive instructions).

Figure 4:
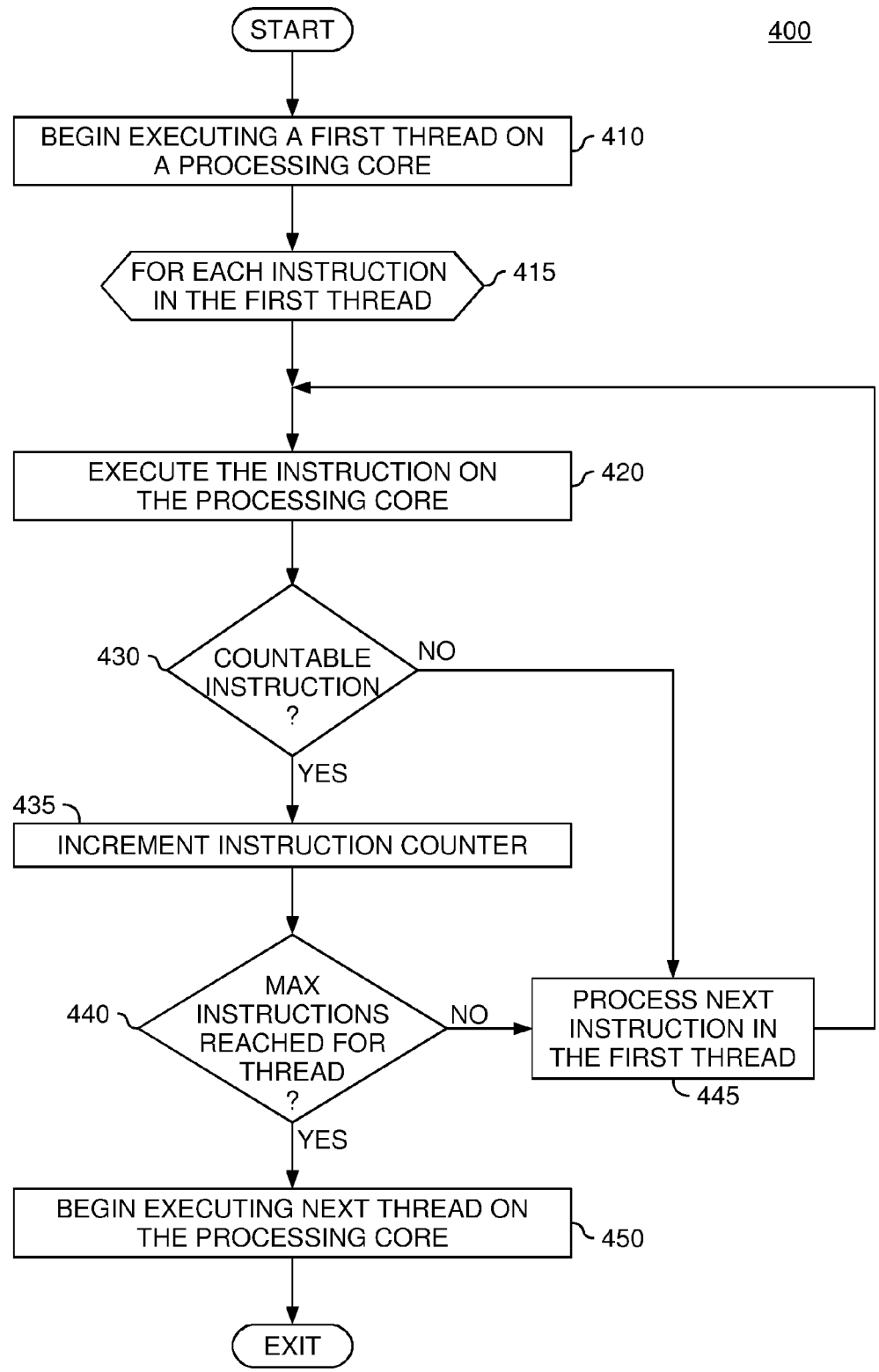
FIG. 4 is a flow diagram illustrating a method for thread scheduling on a processing cord, according to one embodiment described herein.

FIG. 4 is a flow diagram illustrating a method for thread scheduling on a processing core, according to one embodiment described herein. As shown, the method 400 begins at block 410, where the thread scheduling component 130 begins executing a first thread on a processing core. The method 400 then enters a loop for each instruction in the first thread (at block 415), where the processing core executes the instruction (at block 420). In the depicted embodiment, the thread scheduling component 130 then determines whether the executed instruction is a countable instruction (block 430). For instance, as discussed above, the thread scheduling component 130 could determine whether the instruction is a countable instruction by applying a mask value to an instruction identifier for the executed instruction.

If the thread scheduling component 130 determines the instruction is not a countable instruction, the next instruction for the first thread is processed (block 445) and the method 400 returns to block 420, where the processing core executes the next instruction. If instead the thread scheduling component 130 determines the instruction is a countable instruction, the thread scheduling component 130 then increments an instruction counter value associated with the first thread (block 435). In one embodiment, the instruction counter value is stored in a register on the processor.

The thread scheduling component 130 then determines whether a maximum number of countable instructions for the first thread has been reached (block 440). If the thread scheduling component 130 determines the maximum number of countable instructions has not yet been reached, then the next instruction for the first thread is proceed (block 445)

and the method 400 returns to block 420, where the processing core executes the next instruction. If instead the thread scheduling component 130 determines that the maximum number of countable instruction has been reached, then the thread scheduling component 130 suspends the execution of the first thread on the processing core and begins the execution of a second thread on the processing core (block 450), and the method 400 ends.

For instance, the thread scheduling component 130 could store a context of the first thread and could then suspend the execution of the first thread on the processing core. The thread scheduling component 130 could then load a context of the second thread (e.g., into registers on the processor) and could begin executing instructions associated with the second thread. Additionally, the thread scheduling component 130 could reset a counter (e.g., in a register) storing a number of countable instructions for the currently executing thread, and could begin maintaining a count of countable instructions executed by the second thread using the counter.

Figure 5:
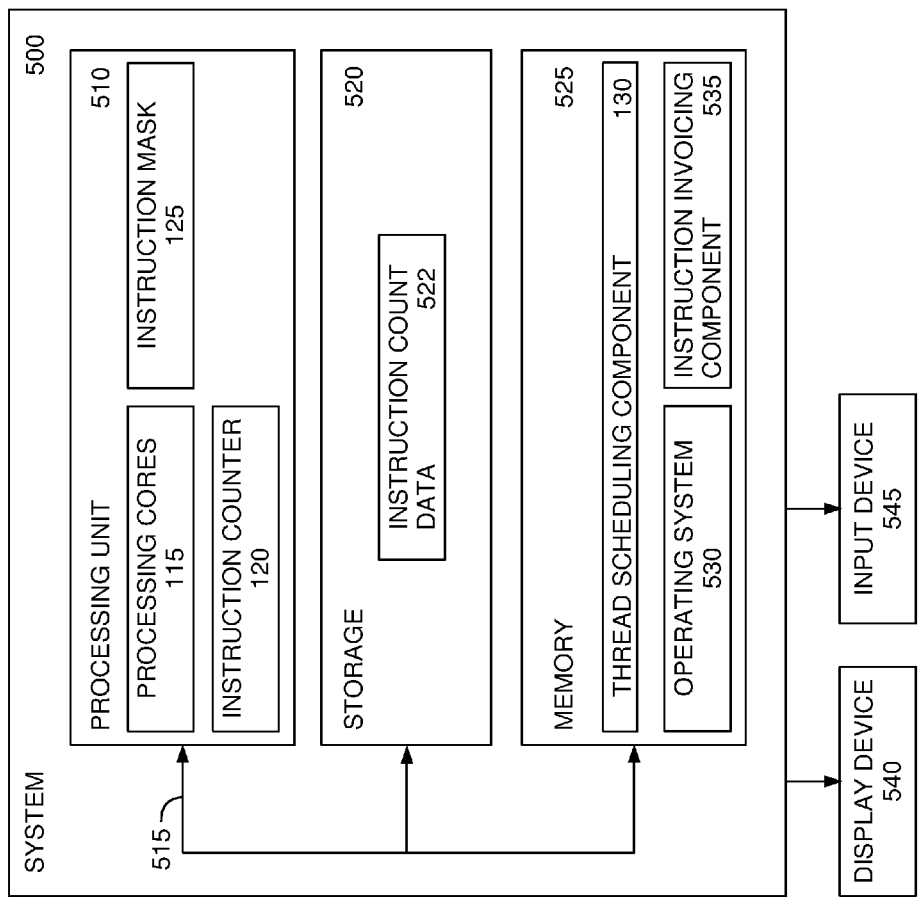
FIG. 5 is a block diagram illustrating a system configured with a thread scheduling component, according to one embodiment described herein.

FIG. 5 is a block diagram illustrating a system configured with a thread scheduling component, according to one embodiment described herein. As shown, the system 500 includes a processing unit 510, storage 520, and memory 525, interconnected via a bus 515. Generally, the processing unit 510 retrieves and executes programming instructions stored in the memory 525. Processing unit 510 is included to be representative of a single CPU, multiple CPUs, a single CPU having multiple processing cores, CPUs having multiple execution paths, and the like. More generally, the processing unit 510 is representative of any multi-threaded processor capable of context switching between multiple threads. The memory 525 is generally included to be representative of a random access memory. The system 500 may also include a network interface that enables the system 500 to connect to a data communications network (e.g., wired Ethernet connection or an 802.11 wireless network). Further, while the depicted embodiment illustrates the components of a particular computing system, one of ordinary skill in the art will recognize that the system 500 and its components may use a variety of different hardware architectures. Moreover, it is explicitly contemplated that embodiments of the invention may be implemented using any device or computer system capable of performing the functions described herein.

The storage 520 represents any storage memory device (e.g., conventional hard disks, solid state disks, etc.) accessible by the system 500. The memory 525 represents any memory sufficiently large to hold the necessary programs and data structures. Memory 525 could be one or a combination of memory devices, including Random Access Memory, nonvolatile or backup memory (e.g., programmable or Flash memories, read-only memories, etc.). In addition, memory 525 and storage 520 may be considered to include memory physically located elsewhere; for example, on another computer communicatively coupled to the system 500. Illustratively, the memory 525 includes an operating system 530, a thread scheduling component 130 and an instruction invoicing component 535. The operating system 530 generally controls the execution of application programs on the system 500. Examples of operating system 530 include UNIX, a version of the Microsoft Windows® operating system, and distributions of the Linux® operating system. Additional examples of operating system 530 include custom operating systems for gaming consoles, including the custom operating systems for systems such as the Nintendo DS® and Sony PSP®. Generally, the thread scheduling component 130 is configured to manage context switching between threads on the processing cores 115, based on a number of countable instructions executed by the currently executing thread.

The system 500 also includes a display device 540 and input devices 545. The input devices 545 could represent a variety of different input devices, such as a keyboard, a mouse, and a touch screen. Likewise, the display device 540 could be any device capable of displaying an interface for applications running on the system 500 (e.g., a monitor, a touch screen on a portable gaming device, a television display, etc.). Additionally, the input devices 545 may include a set of buttons, switches or other physical device mechanisms for controlling the system 500.

As shown, the processing unit 510 contains processing core(s) 115, an instruction counter(s) 120, and an instruction mask(s) 125. Generally, instruction counter 120 is a portion of memory (e.g., a register) used to store a count of countable instructions that the currently executing thread on the processing core 115 has executed. In one embodiment, a separate instruction counter 120 is provided for each of the processing cores 115 on the processing unit 510, and each instruction counter 120 stores a count of countable instructions for its corresponding processing core 115. As discussed above, in an embodiment where the processing unit 510 is a simultaneous multi-threading processor, the processing unit 510 may contain a separate instruction counter 120 and instruction mask 125 for each thread the simultaneous multi-threading processing core is capable of executing in parallel. For example, if the processing core 115 is capable of executing four separate threads simultaneous, the processing unit 510 could contain four instruction counters 120 and four instruction masks 125. In a particular embodiment, while the processing unit 510 could contain an instruction counter 120 for each thread the processing core 515 is capable of executing in parallel, the processing unit 510 could contain a fewer number of instruction masks 125. For example, such a processing unit 510 could contain only a single mask 125, which is then used to determine which instructions should count for each of the instruction counters 120.

Generally, the instruction mask 125 (e.g., a value stored in a register) is used to determine whether a particular instruction is a countable instruction or an uncounted instruction. For instance, each bit of a plurality of bits in the instruction mask 125 could correspond to a different instruction, and these bits could be set if the corresponding instruction is a countable instruction. That is, a particular bit could be set to "1" if the corresponding instruction is a countable instruction and could be set to "0" if the corresponding instruction is an uncounted instruction. The thread scheduling component 130 could then determine an instruction identifier value for a particular instruction (e.g., a value where a single bit corresponding to the particular instruction is set) and could apply the instruction mask 125 by performing an AND operation between the instruction mask 125 and the instruction identifier value. The thread scheduling component 130 could then determine that the particular instruction is a countable instruction if the resulting value from the AND operation contains any set bits. If the resulting value does not contain any set bits, the thread scheduling component 130 could instead determine that the particular instruction is an uncounted instruction.

As discussed above, the thread scheduling component 130 represents software configured to manage a plurality of threads on a multi-threaded processing core. For instance, the thread scheduling component 130 could maintain an instruction count threshold indicative of how many countable instructions of a thread the multi-threading processing core 115 will execute before context switching to another one of the plurality of threads. As instructions are executed on the processing core 115 for a first one of the plurality of threads, the thread scheduling component 130 could maintain a number of countable instructions from the first plurality of instructions that the processing core 115 has processed. This count could be maintained, for instance, in the instruction counter 120. Additionally, the thread scheduling component 130 could be configured to recognize particular instructions as uncounted instructions, such that the execution of these uncounted instructions on the processing core 115 does not affect the value in the instruction counter 120. Put another way, the thread scheduling component 130 could be configured to ignore the execution of these uncounted instructions for purposes of context switching on the processing core 115. Upon determining that the number of countable instructions exceeds the instruction count threshold, thread scheduling component 130 could perform a context switch for the processing core, where the currently executing thread is suspended and the execution of a second thread begins (or is resumed) on the processing core 115. As part of this context switching operation, the thread scheduling component 130 could also reset the value of the instruction counter register 120 and could begin maintaining a count of countable instructions executed for the second thread in the instruction counter 120.

Additionally, the instruction invoicing component 535 represents software configured to determine which of a plurality of different tiers each instruction executed by a thread on one of the processing cores 115 belongs to. The instruction invoicing component 535 could then determine a monetary cost for executing the instruction based on the determined tier and could generate an invoice to a user including the determined cost. As an example, and without limitation, the instruction invoicing component 535 could be configured to classify instructions into one of four different tiers, where three of the tiers include countable instructions and the fourth tier includes uncounted instructions. Additionally, within the three tiers of countable instructions, the instruction invoicing component 535 could associate one of the tiers with a lower price per instruction, another one of the tiers with a medium price per instruction, and the remaining tier with a high price per instruction. In one embodiment, each instruction is assigned to a respective one of the tiers based on how frequently the instruction can be executed simultaneously and in parallel with other instructions on one of the processing cores 115 (e.g., using Hyper-Threading technology).

In a particular embodiment, each instruction is assigned to a respective one of the tiers based on how resource intensive the instruction is to execute. Thus, for example, assuming a floating point operation is a relatively resource unintensive operation to execute, an instruction whose execution involves a floating point operation may be placed into a lower priced tier. As a second example, assuming that a START I/O operation is a more resource intensive instruction to execute, an instruction whose execution involves a START I/O operation may be placed into a higher priced tier. Of course, one of ordinary skill in the art will recognize that the above examples are provided for illustrative purposes only and are without limitation. Moreover, it is broadly contemplated that instructions may be placed into various tiers based on any number of factors mentioned in this disclosure and/or based on any other factors recognized by one of ordinary skill in the art.

In the foregoing, reference is made to embodiments of the invention. However, it should be understood that the present disclosure is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aforementioned aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user could execute an application on a computing system in the cloud that is configured with a thread scheduling component. For example, the computing system could be configured with the thread scheduling component 130 and several users could submit jobs to the computing system for execution. In such a case, the thread scheduling component 130 could begin executing a thread corresponding to the first user on a processing core of the computing system and monitor how many countable instructions of the thread have been executed by the processing core. As discussed above, the processing core could be capable of executing a plurality of different instructions, and the thread scheduling component 130 could be configured to recognize a first subset of the plurality of instructions as countable instructions and a second subset of the plurality of instructions as non-countable instructions. When the thread scheduling component 130 determines the instruction count for the first thread exceeds a predefined threshold amount of instructions, the thread scheduling component 130 could begin executing a second thread corresponding to a second user on the processing core. Doing so ensures that each user's job receives a fair allotment of processing core cycles and allows the users to make use of the processing resources from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of managing a plurality of threads on a multi-threading processing core, comprising:
providing an instruction count threshold condition that determines how many countable instructions of a thread the multi-threading processing core will execute before context switching to another one of the plurality of threads;

processing a first plurality of instructions for a first one of the plurality of threads on the multi-threading processing core;

determining, for each of the first plurality of instructions, whether the instruction is a countable instruction such that execution of the instruction influences context switching for the multi-threading processing core, wherein at least one of the first plurality of instructions is not a countable instruction such that execution of the at least one instruction does not influence context switching for the multi-threading processing core;

determining a plurality of instruction tiers, each corresponding to a respective one or more different types of instructions and each having a respective cost value;

for each of the first plurality of instructions executed on the processing core for the thread, determining which one of the plurality of instruction tiers the respective instruction corresponds to, according to a type of the instruction;

maintaining, for each of the plurality of instruction tiers, a respective count of the countable instructions that have been executed; and upon determining that the instruction count threshold condition is satisfied, based on the maintained counts, switching the multi-threading processing core to process a second plurality of instructions for a second one of the plurality of threads.

2. The method of claim 1, wherein determining whether the instruction is a countable instruction is based on an instruction mask, and further comprises:

generating an instruction identification value for a first instruction in the first plurality of instructions; and applying the instruction mask to the generated instruction identification value to determine whether the first instruction is a countable instruction.

3. The method of claim 2, wherein the instruction mask contains a set bit corresponding to each countable instruction in the first plurality of instructions.

4. The method of claim 2, wherein the instruction identification value comprises a plurality of bits, wherein each of the plurality of bits corresponds to a different type of instruction, and wherein generating an instruction identification value for a first instruction in the first plurality of instructions further comprises:

setting a first bit of the plurality of bits that corresponds to an instruction type of the first instruction.

5. The method of claim 1, wherein switching the multi-threading processing core to process a second plurality of instructions for a second one of the plurality of threads further comprises:

suspending an execution of the first thread on the multi-threaded processing core; and beginning execution of the second thread on the multi-threaded processing core.

6. The method of claim 1, wherein switching the multi-threading processing core to process a second plurality of instructions for a second one of the plurality of threads further comprises:

storing a first context containing one or more values from the multi-threaded processing core corresponding to the execution of the first thread; and loading a second context corresponding to the execution of the second thread into the multi-threaded processing core.

7. The method of claim 1, further comprising:

upon determining that the instruction count threshold condition is satisfied, resetting an instruction counter value; and maintaining, using the instruction counter value, a second count of countable instructions from the second plurality of instructions that the multi-threaded processing core has processed, wherein at least one of the second plurality of instructions is not a countable instruction.

8. A method of managing a plurality of threads on a multi-threading processing core, comprising:

providing an instruction count threshold condition that determines how many countable instructions of a thread the multi-threading processing core will execute before context switching to another one of the plurality of threads;

processing a first plurality of instructions for a first one of the plurality of threads on the multi-threading processing core;

determining, for each of the first plurality of instructions, whether the instruction is a countable instruction, wherein at least one of the first plurality of instructions is not a countable instruction;

maintaining a count of the countable instructions;

upon determining that the instruction count threshold condition is satisfied, based on the maintained count, switching the multi-threading processing core to process a second plurality of instructions for a second one of the plurality of threads;

providing a plurality of instruction tiers, each of the instruction tiers having (i) a predefined association with a different one or more types of instructions and (ii) a respective cost value;

for each of the first plurality of instructions executed on the processing core for the thread, determining which one of the plurality of instruction tiers the instruction is associated with, according to a type of the instruction;

maintaining a count of executed instructions for each of the plurality of instruction tiers; and upon determining that the instruction count threshold condition is satisfied, based on the maintained count, switching the multi-threading processing core to process a second plurality of instructions for a second one of the plurality of threads, wherein switching the multi-threading processing core to process a second plurality of instructions for a second one of the plurality of threads is further based on the maintained counts of executed instructions for each of the plurality of instruction tiers.

* * * * *